UNITED STATES PATENT OFFICE.

FRANK J. CREQUE, OF CUYAHOGA FALLS, OHIO.

PROCESS OF ORNAMENTING RUBBER ARTICLES.

1,251,182.  Specification of Letters Patent.  Patented Dec. 25, 1917.

No Drawing.  Application filed July 25, 1917. Serial No. 182,794.

*To all whom it may concern:*

Be it known that I, FRANK J. CREQUE, a citizen of the United States, residing at Cuyahoga Falls, in the county of Summit and State of Ohio, have invented certain new and useful Improvements in Processes of Ornamenting Rubber Articles, of which the following is a specification.

This invention relates to a process for ornamenting rubber articles such as toy balloons, bathing caps, and other dipped rubber articles, the object being to provide a process by means of which the surface of the article can be highly ornamented in order to provide the article with a mottled surface.

Another object of my invention is to provide a process by means of which the article can be ornamented after the same has been formed in the usual manner by immersing the article in a rubber solvent in order to distort a portion of the surface to render such portion porous to allow it to readily absorb the coloring matter.

Another object of my invention is to provide a process which is exceedingly simple as it is only necessary to dip the rubber article previously formed first into a rubber solvent and to then immerse the article in a coloring solution.

Other and further objects and advantages of the invention will be hereinafter set forth and the novel features thereof defined by the appended claims.

In carrying out my invention for ornamenting a rubber article such as a balloon, the form is first dipped in a rubber cement until the desired weight is obtained and allowed to dry sufficiently to enable the neck beads to be formed. The balloon is then cured in the usual manner.

The balloon thus formed is then immersed in a rubber solvent such as benzol, gasolene, naphtha, or any suitable combination of the above solvents, and allowed to pickle until the rubber becomes softened which causes the rubber to expand on the form to produce ridges, the high points of the ridges being rendered somewhat porous and soft by the expansion.

After the article is pickled on the form for a sufficient length of time to insure the same expanding and producing ridges it is removed from the pickling tank and immersed in a tank containing a coloring solution which may consist of benzol, naphtha, gasolene, or any suitable combination of the above in combination with oil colors in suitable quantities to obtain the desired shades.

When the article having thus been treated is dipped into the coloring solution the ridges formed thereon by the solvent solution are rendered more porous and soft than the remaining portion of the balloon which still remains tight to the form and therefore absorbs more of the coloring solution so that the article is given a mottled surface conforming to the ridges formed.

While I have described the coloring solution employing oil colors I do not wish to limit myself to the use of oil colors as water colors may be used.

The ornamenting of bathing caps and the like is carried on in substantially the same manner as that already described, and I have found that by experimenting my process can be used successfully for ornamenting any dipped rubber article.

From the foregoing description it will be seen that I have provided a process for ornamenting rubber articles which consists in rendering a portion of the surface soft or porous by a rubber solvent and then immersing said article into a coloring solution to allow the portion which has been rendered porous to absorb the solution.

I claim:

1. The process of coloring rubber articles which consists in first distorting a portion of the surface of the article to render the same porous and then dipping said article into a coloring solution to allow the porous portion to absorb the solution.

2. The process of ornamenting rubber articles, consisting in pickling the previously formed article in a rubber solvent to form portions of the surface thereof porous, and then immersing said article in a coloring solution.

3. The process of ornamenting rubber articles, consisting in first forming the article on a form; then pickling the article in a rubber solvent to produce ridges on the article; and then immersing said article into a coloring solution.

4. The process of ornamenting rubber articles, consisting in distorting the article on the form by pickling the same in a rubber solvent to render portions of the surface thereof soft and porous, and then immersing said article in a coloring solution to allow the porous portions to absorb more of the coloring solution than the remaining portion of said surface.

5. The process of ornamenting rubber articles which consists in forming the article on a form by the dipping process, pickling the article on the form in a rubber solvent to render portions of the surface thereof porous, immersing said article in a coloring solution to allow the porous portions to absorb more of the coloring matter than the remaining portion.

6. The process of ornamenting rubber articles, which consists in dipping the article in a rubber solvent and allowing said article to remain within said solvent until it has been pickled to produce porous ridges and then immersing said article in a coloring solution.

7. The process of forming an ornamental rubber article which consists in pickling the article on its form in a rubber solvent to distort the surface of the article by forming porous ridges thereon when still on the form, and immersing said article in a coloring solution to allow the porous portions thereof to absorb more of the coloring solution than the remaining portions which remain tight to the form.

In testimony whereof I hereunto affix my signature in the presence of two witnesses.

FRANK J. CREQUE.

Witnesses:
L. G. CHELLINGWORTH,
F. C. VAIL.